June 16, 1959  S. T. CARTER  2,890,787
APPARATUS FOR ARRANGING LIKE ARTICLES
IN UNIFORMLY SPACED RELATION
Filed Jan. 25, 1957  4 Sheets-Sheet 1
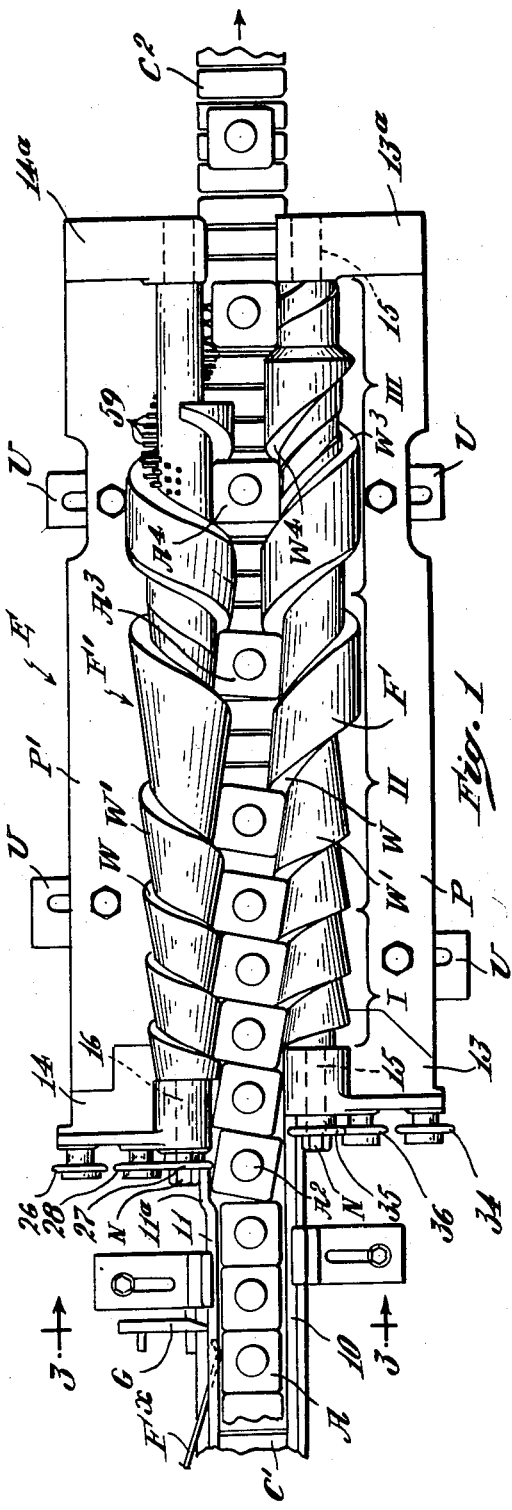
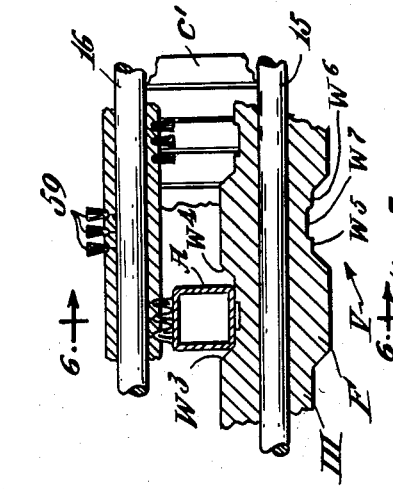
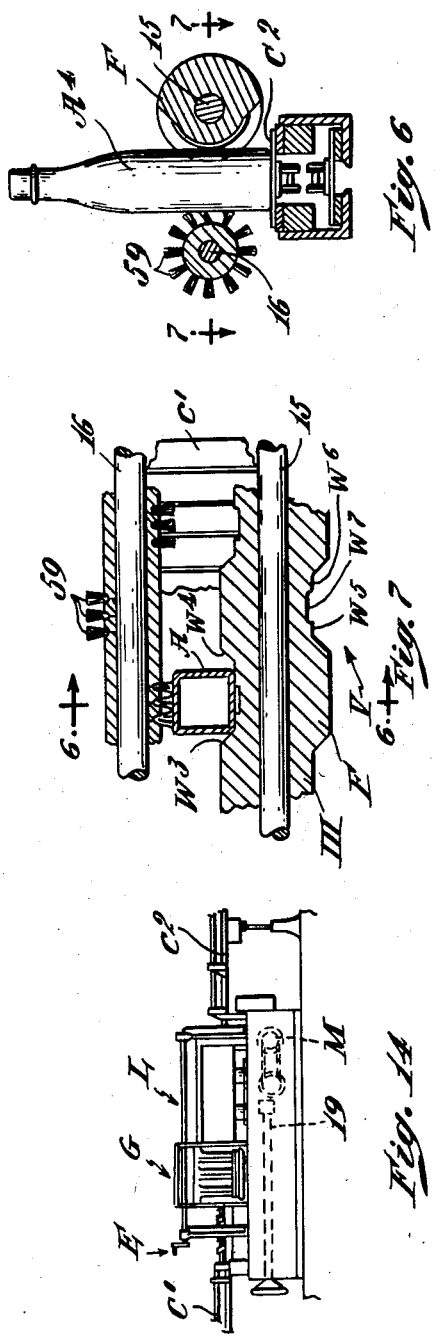
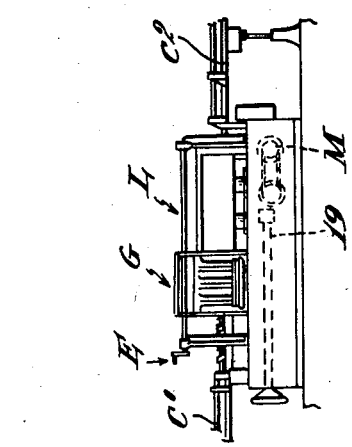
Inventor
Sidney T. Carter
by
Att'ys June 16, 1959 S. T. CARTER 2,890,787
APPARATUS FOR ARRANGING LIKE ARTICLES
IN UNIFORMLY SPACED RELATION
Filed Jan. 25, 1957 4 Sheets-Sheet 2
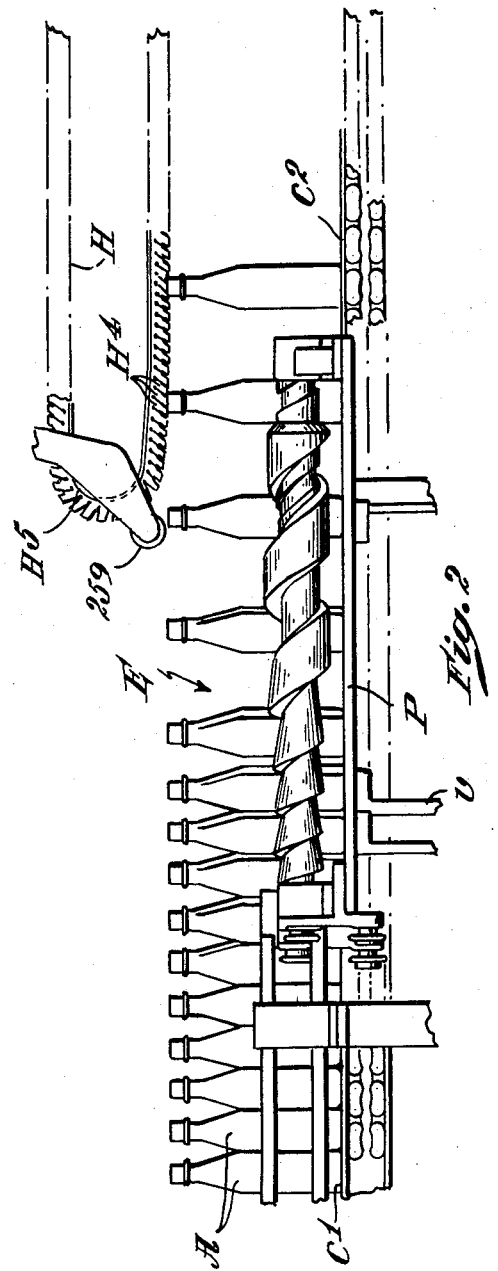
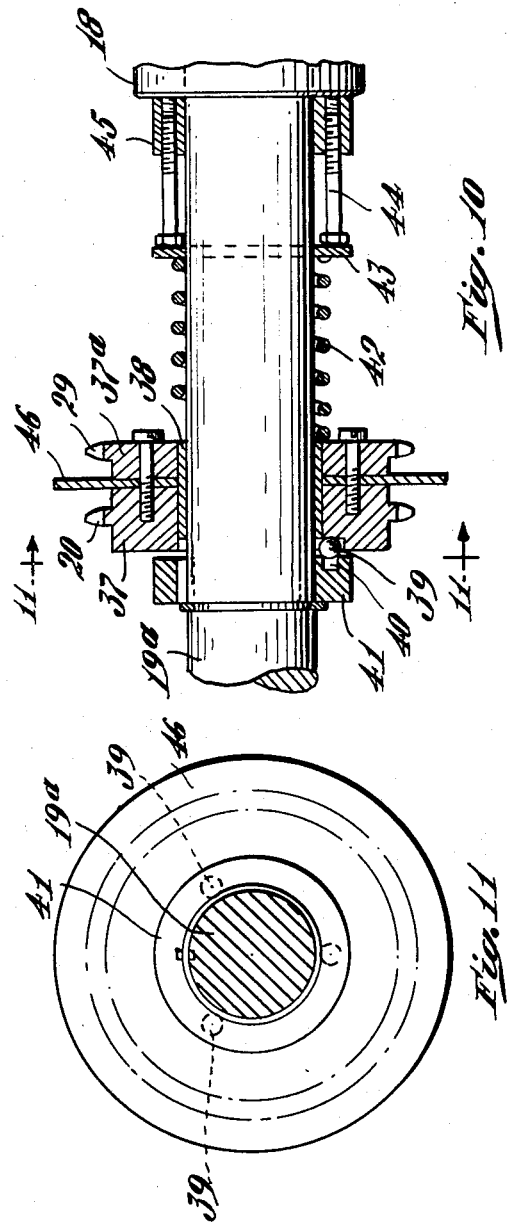
Inventor
Sidney T. Carter

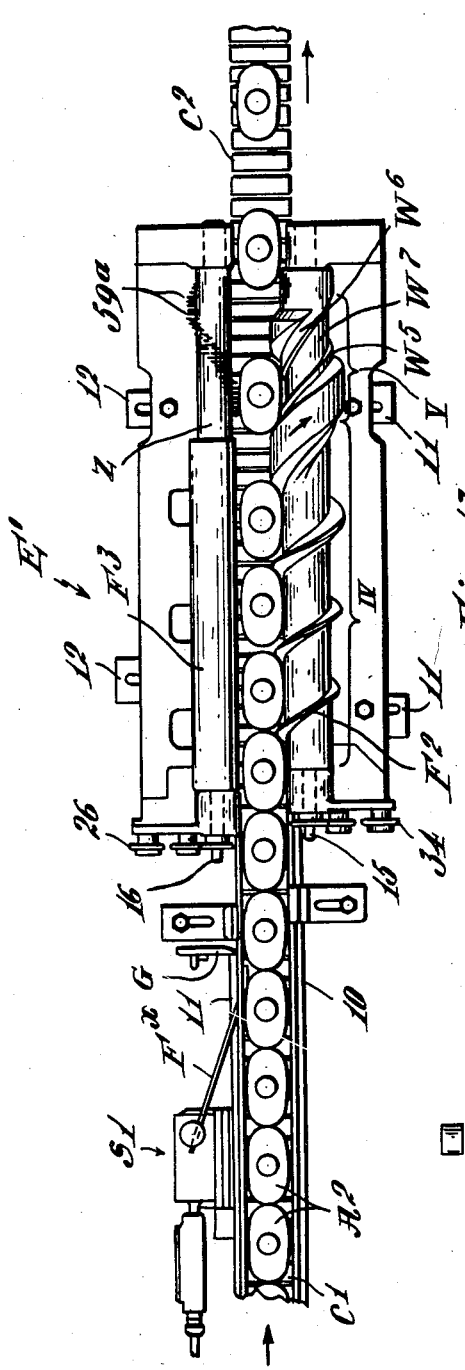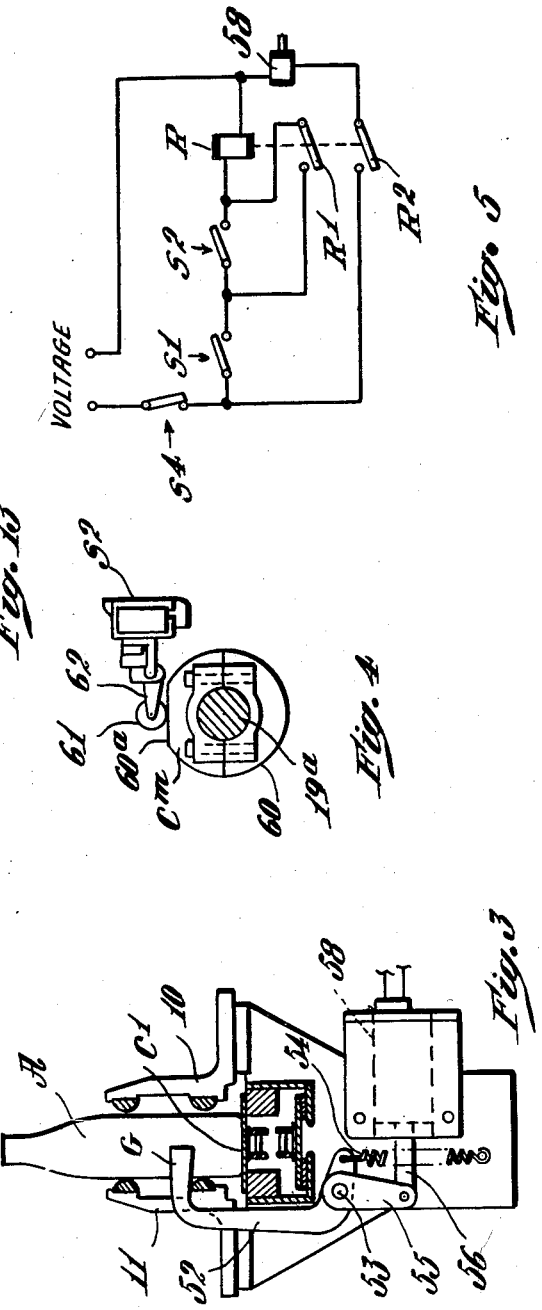

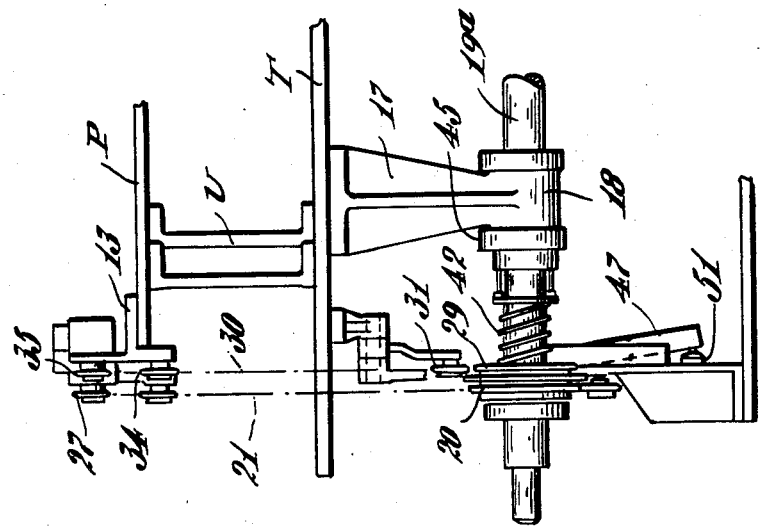
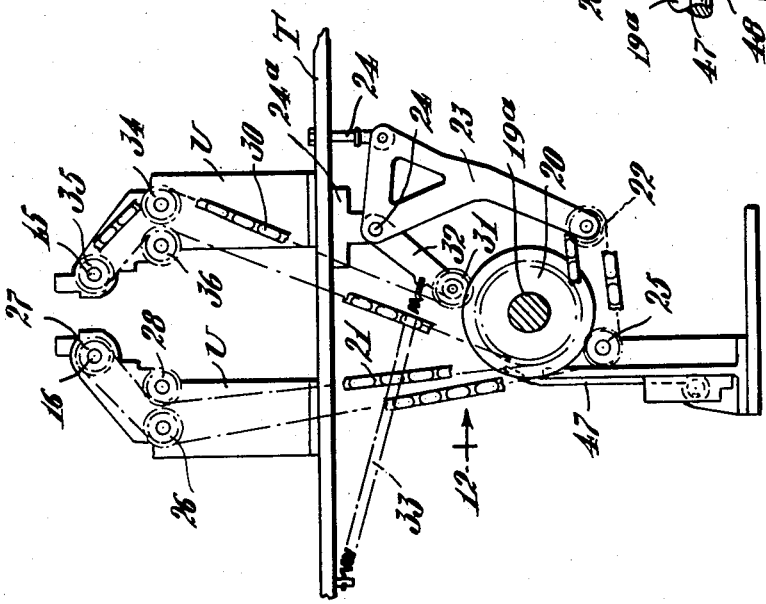

United States Patent Office 2,890,787

Patented June 16, 1959

2,890,787

APPARATUS FOR ARRANGING LIKE ARTICLES IN UNIFORMLY SPACED RELATION

Sidney T. Carter, Shrewsbury, Mass., assignor to Geo. J. Meyer Manufacturing Co., Cudahy, Wis., a corporation of Wisconsin Application January 25, 1957, Serial No. 636,328

31 Claims. (Cl. 198—34)

This invention pertains to feed mechanism for delivering like articles in predetermined spaced relation into a path along which the articles are then moved (while preserving said spaced relation) by a constantly moving conveyor or equivalent means. During such motion of the articles, they may be subjected to any desired processing step or steps. As a specific instance, the articles thus advanced by the conveyor means may be bottles and the processing step may be that of applying a label or labels to each bottle. However, the feed means of the present invention is not limited in its utility to association with a labeling machine although, for convenience in description, it is herein disclosed in such association.

One desirable means for delivering articles to the conveyor path of a labeling machine and certain features of such a labeling machine are illustrated and described in the co-pending application for Letters Patent filed by Sidney T. Carter, December 5, 1955, Serial No. 551,012—the present invention being in the nature of an improvement upon the feeding means therein disclosed.

In labeling machines of the so-called "straight-away" type, the articles to be labeled are moved along a rectilinear path, past the label-applying elements and, desirably, the articles are delivered to the receiving end of the conveyor path in the form of an uninterrupted row or column, each article contacting the article in front of and in back of it, respectively; thus insuring an uninterrupted supply to the labeling means. When the articles to be labeled are circular in transverse section, for example like customary round bottles, the contact of the bottles, each with the next, is limited to a very small area (theoretically, a mere line) at the ends of that diameter of the bottle which coincides with the center line of the path of movement of the column. Thus, at each side of the column, between adjacent bottles, there is a cusp-like recess providing a space for the entry of any appropriate element designed to separate adjacent bottles for spacing them at the desired distance apart. However, if the bottles be of rectangular or square transverse section, they form a column which presents substantially unbroken lateral surfaces, devoid of recesses of sufficient size to admit any usual spacing element; the thread or spire, for example, of a rotary helix or feed screw—such an article-spacing helix being illustrated in the above-named copending application of Carter.

One object of the present invention is to provide article feeding means so designed that it will function with equal facility for the handling of articles whether of the more usual circular contour or those of rectangular or square transverse section. A further object is to provide article-feeding means which is readily adaptable to the handling of articles of different sizes. A further object is to provide feeding means (useful with a constantly moving hold-down device) which is operative to deliver the articles in accurately spaced relation and properly oriented into the field of action of the hold-down device. A further object is to provide feeding means so designed that it exerts a downward force on the articles to hold them firmly down on the conveyor, and thus minimizing the possibility of tipping.

The feed mechanism disclosed in the aforesaid Carter application is capable of handling articles of other than square or rectangular transverse section, for instance bottles of oval contour; but, when, for example, the articles are oval in transverse section, it is necessary, when using the Carter feeding mechanism, to provide means at the labeling station for orienting each article so as to dispose its major axis accurately parallel to the conveyor path to insure application of the label at the proper point. A further object of the present invention is to provide article-feeding means capable of orienting articles of oval or other noncircular shape so that they will enter the labeling machine properly oriented—thus making it unnecessary to complicate the label-applying means by the inclusion therein of devices for orienting the articles. The term "orienting" as herein employed, from its derivation and as it has come to be accepted in this art (see, for example, Patents Nos. 2,426,433, August 26, 1947; 2,614,681, October 21, 1952; 2,723,743, November 15, 1955; and 2,825,422, March 4, 1958), means "turning about a vertical axis." The term "orienting" does not and is not intended herein to suggest or to have reference to the spacing, horizontally, of one article from another.

Because there is always the possibility of a jam of articles within the feeding means, for example because one of the articles may be misshapened or because of breakage of an article and because the feeding means may be required to operate at high speed (for instance to deliver articles at the rate of 300 per minute or there abouts), it is necessary to stop the feed means instantly as soon as a jam occurs. A further object of the present invention is to provide drive means for the feeding device which automatically responds to any abnormal resistance to motion of the parts of the feeding mechanism, resultant, for example, from a jam of articles in the feeding mechanism, thereby instantly to stop the motion of the feeding mechanism and desirably to stop the entire machine.

It is necessary for proper operation that the articles enter the field of action of the feeding means in definite relation to the latter to insure that each article will be picked up by the feeding means at the proper instant, thereby to avoid vibration of the articles lengthwise of the conveyor path with consequent possible breakage; and also that the feed means release the articles into the conveyor path in proper time with the operation of the labeling means. A further object of the invention is to provide for properly timing the advance of the articles in approaching the feed means and in entering the labeling apparatus.

Other and further objects and advantages of the invention will be pointed out in greater detail in the following description and, by reference to the accompanying drawings, wherein:

Fig. 1 is a plan view, omitting certain parts, and showing feeding means, according to the present invention, devised for delivering rectangular articles into a conveyor path;

Fig. 2 is a fragmentary side elevation, to smaller scale than Fig. 1, and omitting parts but showing a portion of a hold-down device for controlling the articles as they enter the labeling machine;

Fig. 3 is a vertical section, for example in the plane 3—3 of Fig. 1, showing a gate for controlling the delivery of articles from the supply into the feeding means;

Fig. 4 is a transverse section (omitting parts) through the main shaft of the machine with which the feeding means of the present invention is associated showing a cam-actuated switch constituting one of the constituent elements of the means for actuating the gate shown in Fig. 3;

Fig. 5 is a wiring diagram showing the controlling circuit for the gate-actuating means of Fig. 3;

Fig. 6 is a fragmentary vertical section on the line 6—6 of Fig. 7;

Fig. 7 is a fragmentary horizontal section on the line 7—7 of Fig. 6;

Fig. 8 is a fragmentary end elevation, partly in section, to smaller scale, showing the means for driving the feeding apparatus of Fig. 1 or 2;

Fig. 9 is a fragmentary front elevation of the parts shown in Fig. 8;

Fig. 10 is a fragmentary side elevation, partly in vertical section, showing means whereby the feeding device is automatically stopped upon the occurrence of a jam;

Fig. 11 is a section on line 11—11 of Fig. 10;

Fig. 12 is a fragmentary side elevation, illustrating means for stopping the labeling machine upon the occurrence of a jam in the feeding mechanism;

Fig. 13 is a view similar to Fig. 1, but showing feeding means for delivering articles, for instance of oval transverse section, into the conveyor path; and, Fig. 14 is a fragmentary diagrammatic front elevation, showing the feed mechanism of the present invention in association with a labeling machine.

Referring to the drawings, and more particularly to Fig. 14, the feed mechanism E of the present invention is shown as arranged to receive articles from a supply conveyor C' and to deliver them to a labeling machine comprising gum-applying means G and label-applying means L, and which delivers the labeled articles to a conveyor C², the labeling means having a main drive shaft 19 which is rotated by an electric motor M.

The articles which are to be spaced apart by the action of the feeding means are indicated in Fig. 1 as square bottles—that is to say, bottles whose body portions are square in horizontal transverse section. However, the invention is not necessarily limited to the handling of bottles nor to articles which are square, since it is also capable of handling articles which are of elongate, rectangular shape in transverse section. As herein illustrated, the articles are advanced from a supply, for instance a capping machine, by the continuously moving conveyor C' which brings the articles A into the field of action of the feeding apparatus. The articles are carried away from the feeding mechanism toward the labeling machine by the conveyor C² which may or may not be a continuation of the conveyor C'. The conveyor or conveyors is or are of the conventional type, for example consisting of a series of flat, smooth, rigid plates secured to an endless chain; the arrangement, as herein disclosed, being such that those plates which form the upper run of the chain are horizontal, providing a constantly moving support upon which the bottles rest, the plates being sufficiently smooth so that relative movement of the bottles and conveyor may take place, the bottom of the bottle sliding on the conveyor plates. However, it is contemplated as within the purview of this invention that other means for moving the articles into and out of the field of action of the feeding means may be employed.

The supply portion C' of the conveyor is provided with parallel guard-rails 10 and 11 spaced apart a distance slightly greater than the front-to-rear width of the article, but the rear guard-rail 11, as shown in Fig. 1, has an offset portion 11ª just to the left of the feeding mechanism so that, at this point, the article path between the guard-rails is increased in width so that it is possible, at this point, for an article to be turned so that its front and rear surfaces are no longer parallel to the longitudinal center line of the conveyor path.

Referring to Figs. 8 and 9 which illustrate desirable means for driving the feeding devices, the character T designates a horizontal table forming a support for the feed means proper. This table T is held in elevated position above the floor by any suitable type of support and, if desired, may form a continuation of the table or equivalent element of the labeling machine with which the feeding apparatus is associated. Upon this table, there are mounted uprights U (Figs. 8 and 9) which support two horizontal plates P and P' (Figs. 1 and 9) whose parallel, proximate edges are spaced apart to lie at opposite sides of the conveyor path. The uprights U are provided with slots which receive bolts by which the plates P and P' are attached to the uprights, making it possible to move the plates P and P' toward or from each other—thus to adapt the apparatus for use in feeding articles of different sizes.

Bearing brackets 13 and 13ª are fixed to the plate P at its opposite ends respectively and similar bearing brackets 14 and 14ª are fixed to the plate P' at its opposite ends. The bearing brackets 13 and 13ª are provided with bearings for a rotary shaft 15 and the bearing brackets 14 and 14ª are provided with bearings for a shaft 16 which is parallel to the shaft 15, the axes of the shafts being adjacent to opposite sides, respectively, of the article path.

Brackets 17 (one of which is shown in Fig. 9) extend downwardly from the under-surface of the table T and carry bearings 18 for a drive shaft 19ª which is coupled to or integral with the main shaft 19 of the labeling machine so that it turns at the same speed and in time with the main shaft of the labeling machine. On the left-hand end portion of the shaft 19ª, as viewed in Fig. 9, there is mounted a sprocket 20 which is engaged by a sprocket chain 21. This chain embraces a tensioning sprocket 22 (Fig. 8) mounted on the lower end of a lever 23, pivoted at 24 upon a bracket 24ª carried by the table T. The lever 23 may be rocked and held in adjusted position by means of a bolt 24 extending up through an opening in the table T. The sprocket chain 21 also passes about an idler sprocket 25, then upwardly through an opening in the table T and over an idler sprocket 26 mounted on a stub shaft carried by the bracket 14, then over a sprocket 27 fixed to the end of the shaft 16, then down over an idler sprocket 28, and thence down through an opening in the table T and into engagement with the sprocket 20.

A second sprocket 29 is also mounted on the shaft 19ª, adjacent to but spaced from sprocket 20, and is embraced by a sprocket chain 30 which is tensioned by engagement with a sprocket wheel 31 carried by a lever 32, pivoted at 24 on bracket 24ª and which is urged in a clockwise direction by a spring 33. Both runs of the sprocket chain 30 pass up through an opening in the table T—one of these runs engaging an idler sprocket 34, the chain then passing up and over a sprocket 35 fixed to the shaft 15, and then down and about an idler sprocket 36.

The arrangement just described provides for driving the shafts 15 and 16 at the same speed but in opposite directions and for the adjustment of shafts 15 and 16 bodily toward and from each other (when the plates P and P' are moved to and from each other) without disturbing the drive connections.

As shown in Figs. 10 and 11, the sprockets 20 and 29 are provided with hubs 37 and 37$^a$ which are secured together by bolts—the hubs having central openings preferably provided with an antifriction bushing 38, for instance of nylon, so that the hubs may turn freely on the shafts 19$^a$ under certain circumstances. The left-hand face, as viewed in Fig. 10, of the hub 37 of the sprocket 20 is provided with a plurality of symmetrically arranged recesses designed to receive detent members such, for example, as ball bearings 39. If the labeling machine to which the articles are to be fed is so designed as to handle three bottles for each revolution of the main shaft, then the hub of the sprocket 20 will be provided with three ball-receiving recesses spaced 120° apart. On the other hand, if the labeling machine is designed to handle but two bottles for each revolution of the main shaft, then there will be but two ball-receiving recesses in the hub of the sprocket 20—such recesses being spaced 180° apart.

Adjacent to the left-hand face of the hub 37 of sprocket 20, there is arranged a collar 41 which is splined to the shaft to turn with the latter and this collar is provided with recesses 40, corresponding in number and spacing to the ball-receiving recesses of the hub. The combined hubs 37 and 37$^a$ of the two sprockets 20 and 29 are urged to the left as viewed in Fig. 10 by a coiled compression spring 42, one end of which bears against the right-hand end of the hub 37$^a$ while the other end engages an adjustable abutment collar 43 loose on the shaft 19$^a$ but which may be adjusted longitudinally of the shaft (thereby to vary the force exerted by the spring 42) by means of bolts 44 having screw-threaded engagement with a ring 45 mounted on the shaft 19$^a$ and which bears at its right-hand face against the bearing 18 in which the shaft 19$^a$ turns.

Interposed between the hubs of sprockets 20 and 29 (Fig. 10), there is a flat disc 46 which, as shown in Fig. 12, is engaged by the upper arm 47 of an elongate lever pivoted at 48 to a fixed part of the machine frame and whose lower end carries a switch actuator 49, disposed opposite the operating button 50 of a snap-action switch S$^4$.

The arrangement just above described is such that under normal conditions, the detent balls 39 engage the recesses 40 in the collar 41 with sufficient pressure so that as the shaft 19$^a$ turns, the two sprockets 20 and 29 are turned at the same speed as the shaft and, thus, constantly turn the parallel shafts 15 and 16 of the feeding mechanism in opposite directions and at the same angular velocity. However, if as the result of a jam occurring in the feeding mechanism, such as may be occasioned by the passage of an irregular article, the tipping of an article, or the breakage of an article, the feeding mechanism offers abnormal resistance to operation, with the result that the detent balls 39 are forced out of the recesses 40 so that the sprocket wheels 20 and 29 are no longer driven, and thus the feed mechanism stops. At the same time, the axial motion of the sprocket wheel hubs 37, 37$^a$ causes the disc 46 to press against and rock the arm 47 of the actuating lever and actuate the switch S$^4$ which controls the motor circuit of the labeling machine—thus, instantly stopping the drive of the shaft 19$^a$. It may be noted, however, that because of the symmetrical arrangement of the detent balls 39 and recesses 40, the apparatus will again be brought into properly timed relation whenever the obstruction is removed from the feeding mechanism and the drive circuit is again closed.

Referring to Figs. 1, 3, 5 and 13, it may be noted that there is associated with the supply portion C' of the conveyor a pivoted feeler arm F$^x$ whose free end is spring-biased to stand in the path of movement of the articles as they are carried along by the conveyor C'. This feeler arm F$^x$ is connected to a switch S' in such a way that so long as the free end of the arm F$^x$ is held out of the article path by an article within said path, the circuit switch will be closed, thus permitting the machine to operate, assuming that other switches in the circuit are likewise closed. However, if there should come a break in the run of articles moving along on the conveyor C', the free end of the arm F$^x$ will move inwardly toward the center of the conveyor path and then the circuit at the switch S' will be broken—thus, stopping the machine. The switch S' (Fig. 5) is in series with a second switch S$^2$ (Figs. 4 and 5). The switch S$^2$ is controlled by a cam C$^m$ fixed to the shaft 19$^a$. This cam has an arcuate dwell portion 60 and a flat or active portion 60$^a$. A roll 61 on a switch-actuating lever 62 engages the periphery of the cam C$^m$. When the roll contacts the dwell portion of the cam, the switch S$^2$ is open; but, when the roll contacts the flat 60$^a$, the switch is closed. The switches S' and S$^2$ are in series with a relay R which has two normally open switches R' and R$^2$. The switch R' is in parallel with the switch S$^2$ while the switch R$^2$ is in series with the solenoid 58.

Spaced from the receiving end of the article-spacing means (as here shown a distance approximating the thickness of three of the articles which are to be handled), there is arranged a gate member G (Figs. 1, 3 and 13) which is carried by the upright arm 52 of a bell-crank lever which is pivoted at 53 and which is urged in a clockwise direction, as viewed in Fig. 3, by a tension spring 54. A downwardly directed arm 55 is fixed to this lever, and the arm 55 is pivotally connected to a rod 56 which is secured to or which forms the core of the solenoid 58. With the arrangement as shown in Fig. 3, when the solenoid is not energized, the spring 54 keeps the gate G in a position such as to obstruct the passage of articles along the conveyor path, but when the solenoid is energized, the rod 56 will be moved to the right, as shown in Fig. 3—thus, withdrawing the gate G from the conveyor path.

In Fig. 3, the gate G is in the position which it occupies when the solenoid 58 is de-energized. When the solenoid 58 is energized, the gate G is pulled away from the article path into the position shown in Figs. 1 and 13. The first bottle coming along the conveyor C', which engages the feeler F$^x$, acts to close the switch S'; but if, at this time, the roll 61 is in contact with the dwell portion 60 of the cam C$^m$, the switch S$^2$ is open and the solenoid 58 is de-energized so that the gate G prevents the bottle from advancing into the feed mechanism. However, if the roller 61 on the switch-actuating lever 62 drops onto the flat 60$^a$ of the cam C$^m$, the switch S$^2$ is closed and the relay R is thereby energized, thus closing the normally open switches R' and R$^2$. The solenoid 58 is now energized, thus withdrawing the gate G from the article path just at the proper instant to permit the foremost article to advance in properly timed relation to be received by the feed screws F and F'. The cam C$^m$, which turns one revolution for each cycle of the machine, is adjustable so that the time at which the articles are released by the gate G can be properly controlled to assure that the first bottle will arrive in the correctly timed relation to the grooves in the feed screws and also so that the first three bottles are in correctly timed relation to the labeling machine—the shaft 19 of the latter turning with shaft 19$^a$. If a space occurs between the articles moving into the feeding mechanism, the feeler F$^x$ will move inwardly into the article path thereby opening the switch S' and thus breaking the circuit through the relay R and allowing the switches R' and R$^2$ to open and de-energize the solenoid 58 so that the gate G will again extend across the article path and prevent further advance of the articles until a solid column of articles has built up behind the gate.

The shafts 15 and 16 carry the feed screws or helices F and F', respectively. As illustrated in Fig. 1, each of these screws comprises three sections I, II, and III, respectively. These sections may be separate and independent for ease in manufacture although it is contemplated that they may be parts of the same unitary screw. In each of sections I and II, the screw thread is of the type sometimes known as a "ratchet thread"; the wall W of the helical groove being substantially perpendicular to the axis, while the other wall W' of the groove slopes, from its intersection with the wall W, outwardly to the periphery of the screw.

In the section I, the pitch of the screw thread is uniform and the wall W' is inclined to the axis of the screw at an angle of the order of 10°, while the width of the wall W' is approximately equal to the width of the side face of the article A which is to be handled. Section II of each screw has a thread of increasing pitch so that the width of the wall W' gradually increases; while, the final section III of each screw has a thread of uniform pitch. In this last section, the thread approximates that known as a "square thread"; having side walls $W^3$ and $W^4$ and a cylindrically curved bottom wall (Fig. 7) comprising the spaced portions $W^5$ and $W^6$ separated by a shallow recess $W^7$.

The pitch of the screw in the first section I is such that articles engaging this part of the screw are moved more slowly than the upper surface of the conveyor so that at this part of the field of operation of the feeding device, the screw does not propel the articles and the articles are, in fact, held by the conveyor against the wall W of the screw F as viewed in Fig. 1. It will be noted by inspection of Fig. 1, that the screws F and F' are relatively reversed and so relatively arranged that when an article is disposed between them, the forward face of an article is adjacent to the wall W of the screw F and the rear face of the article is adjacent to the wall W of the screw F'. Assuming that articles have just begun to enter the field of action of the feeding means, the first article A to engage the feed screws will be turned or oriented about its vertical axis, because of the inclination of the walls W' of the groove in the screw, so that its side faces are inclined at an angle of 10°, approximately, to the longitudinal center line of the article path. This orienting of the first article will re-act upon those immediately behind it so as to cause them to be oriented—the widening of the conveyor path at the point $11^a$ permitting such orientation. It will be noted that, as the articles approach the feeding mechanism (coming from the left of Fig. 1), their flat faces are in contact so that there is but little space between them available for the entry of spacing elements. However, when the articles occupy the positions indicated by the charatcer $A^2$, where they have been turned through an angle of approximately 10°, the side faces of the row of articles presents a series of steps or shoulders for contact with the walls W of the screw threads—thus, the screws are enabled positively to engage the articles; and, as the articles enter the section II of the screws, the latter are enabled, with certainty, to move the articles ahead and with increasing velocity so that the articles are gradually separated from each other. The pitch of the final turn of the section III is such that when an article reaches the position indicated at $A^3$ (Fig. 1), it is advancing at substantially the same speed as the conveyor. The turns of the third section of the screw thread are of a pitch such as to continue the motion of the article at the same speed as the conveyor so that in leaving the screw threads, the articles are accurately spaced at the desired distances apart. During their passage through sections II and III of the screws, the articles are gradually re-oriented so that they emerge from between the screws with their opposite faces accurately parallel to the center line of the article path.

As illustrated in Figs. 1 and 7, because of the relative longitudinal offsetting of the two screws, the screw thread in the section III of the screw F' does not extend to the right-hand end of shaft 16. Beyond this end of the screw, the shaft 16 carries a helical brush 59. This brush is not designed to assist in the advance of the articles but functions firstly; to assist in returning the article to a position such as shown at $A^4$, where its side faces are parallel to the center line of the conveyor path; and, secondly, to urge the article toward the rear wall $W^3$ of the screw F—thus, assuring the delivery of the article by the screw thread in accurately spaced relation to the next adjacent article; and, thirdly, to exert downward frictional force upon the face of the article, thus pressing it firmly against the upper surface of the conveyor thereby to minimize tendency of the article to tip.

It may be noted, by reference to Fig. 2, that the apparatus is particularly designed for use with a labeling machine of the kind in which there is provided a continuously moving hold-down device comprising, for example, an endless belt H which forms a support for a series of blocks $H^4$ of rubber or other resilient material separated by downwardly inclined slots which, as here shown, are preferably so arranged that in the article-engaging run of the belt, they slope rearwardly—the belt H passing about a guide sprocket $H^5$ and having associated with its receiving end a feeler device 259 engageable by the top of an article of abnormal height and operable thereby to actuate a switch for stopping the machine. A generally similar hold-down device is described in the above-noted application of Carter, No. 551,012.

As shown in Fig. 2, the delivery end portion of the feed mechanism of the present invention is so located with respect to the hold-down device that just before the article comes into the field of action of the hold-down device, it has been accurately re-oriented, relatively to the center line of the conveyor path and is being engaged by the brush 59 which thus helps to steady the article while the hold-down device is coming into action.

As above noted, the arrangement shown in Figs. 1 and 2 is particularly designed for handling articles which are rectangular or square although it is capable of handling articles of other shapes. The screws F and F' are secured to the shafts 15 and 16 by means of nuts N (Fig. 1) and may readily be relatively adjusted or removed for replacement by screws having threads of other shapes, for use with articles of other shapes or sizes.

In Fig. 13, there is illustrated a modification of the apparatus above described which is particularly intended for handling articles such, for example, as bottles which are elliptical in transverse section. In this arrangement, the parts are, in general, similar to those above described and are designated by corresponding characters, except that the forward screw F of Fig. 1 is replaced by a screw $F^2$ which may, for example, be like the feed screw described in the aforesaid Carter application, this screw comprising but two sections, IV and V, respectively, the section IV being of increasing pitch so that it receives the articles at a relatively low velocity and then gradually increases the space between them and delivers them, spaced apart accurately at the desired distance, to the section V. This latter section is of uniform pitch and like section III of the screw of Fig. 1. In this instance, the rear screw F' of Fig. 1 is replaced by a smooth, cylindrical roll $F^3$ which is free to turn on the shaft 16. This roll does not extend the entire length of the feeding apparatus, but at the location of the brush 59 of Fig. 1, there is arranged a sleeve Z fixed to the shaft 16 and which carries a spiral brush $59^a$ whose function is similar to that of the brush 59 above described. In this arrangement of Fig. 13, the rear guard-rail 11 of the supply conveyor C' is not provided with an offset such as the offset $11^a$ of Fig. 1, so that the articles are constrained by the parallel guard-rails to enter between the screw $F^2$ and the roll $F^3$ with their longer axes accurately coincident with the center line of the conveyor. The pitch of the thread of the screw $F^2$ is such as to keep the articles in this position as they are advanced, the roll $F^3$ bearing against the rear sides of the articles and preventing them from turning as they are advanced. The pitch of the helical brush is such that as the articles reach the field of action of the brush, the latter tends to force them against the rear wall of the screw thread while, at the same time, urging them toward the inner wall of the screw thread. This inner wall is like that of the section III (Fig. 7)—thus, providing two spaced surfaces $W^5$ and $W^6$ for contact with the rounded corners of the elliptical article. The latter thus makes a three-point contact with the screw and is thus held in accurate position so that when delivered, its major axis is exactly in line with the conveyor. This brush pushes the article firmly and erectly against the conveyor and the feed screw $F^2$ so that the article, as it leaves the feeding mechanism, is in exactly the correct position to receive a label. This device thus makes unnecessary any further orientation of the article such as has heretofore been necessary at the labeling station itself. Before the articles leave the feeding mechanism, they are engaged by the hold-down device, so that they cannot become accidentally turned and are thus delivered to the labeling device in proper position so that no orienting means is required at the labeling station.

While certain desirable embodiments of the invention have herein been described and illustrated by way of example, it is to be understood that the invention is broadly inclusive of any and all modifications falling within the scope of the appended claims.

I claim:

1. In combination in apparatus for arranging like articles in uniformly spaced relation, article-spacing means, means for moving articles one after another through the field of action of the spacing means, supply means for advancing the articles, one after another, toward the spacing means in a column which presents substantially unbroken lateral surfaces, devoid of recesses of sufficient size to admit any usual spacer element, and means whereby the leading article in the column is so turned about its vertical axis as it enters the field of action of the spacing means, as to enable an element of the spacing means to enter between said leading article and the next following article.

2. In combination in apparatus for arranging like articles in uniformly spaced relation, article-spacing means, means for moving articles one after another through the field of action of the spacing means, supply means for advancing the articles, in a row in which each article normally contacts the next following article, toward said article-spacing means, and means whereby the leading article in the row is so oriented, as it enters the field of action of the spacing means, as to enable an element of the spacing means to enter between said leading article and the next following article, the spacing means comprising a rotary helix of increasing pitch, and the article-orienting means comprises a helix of constant pitch.

3. The combination, according to claim 1, wherein the spacing means comprises two oppositely rotating helices whose axes are parallel and which are located at opposite sides, respectively, of the path of movement of the articles, one of said helices being reversed relatively to the other whereby, when an article is disposed between the helices, the front face of the article will be adjacent to the forward wall of the groove of one helix while the rear face of the article will be adjacent to the rear wall of the groove of the other helix.

4. The combination, according to claim 1, wherein the means for moving the articles through the field of action of the spacing means comprises two like, oppositely rotating helices, each of increasing pitch, and arranged at opposite sides of the article path, and the means for orienting the articles comprises two like, oppositely rotating helices and which are so devised as to orient each article through an angle of approximately 10° as it approaches the spacing means.

5. In combination in apparatus for arranging like articles in uniformly spaced relation, article-spacing means, means for moving articles one after another through the field of action of the spacing means, supply means for moving articles, one after another, toward the spacing means in a row (in which each article normally contacts the next following article), means whereby the leading article in the row is so oriented, as it enters the field of action of the spacing means, as to enable an element of the spacing means to enter between said leading article and the next following article, the means for moving the articles through the field of action of the spacing means being a constantly moving conveyor on which the articles rest, and the spacing means comprising a rotary helix of increasing pitch, the pitch of the helix being so designed, with reference to the speed of the conveyor, that an article which is engaged by the helix only attains the speed of the conveyor as the article approaches the delivery end of the helix, further characterized in having a constantly rotating helical brush arranged to engage the peripheral surfaces of the articles as they are delivered from the spacing means, the pitch of the helical brush being such as to exert force tending to retard advance of the articles.

6. In combination in apparatus for arranging like articles in uniformly spaced relation, article-spacing means, means for moving articles, one after another through the field of action of the spacing means, supply means for moving the articles, one after another, toward the spacing means in a row (in which each article normally contacts the next following article), means whereby the leading article in the row is so oriented, as it enters the field of action of the spacing means, as to enable an element of the spacing means to enter between said leading article and the next following article, the means for moving the articles through the field of action of the spacing means being a constantly moving conveyor on which the articles rest, and the spacing means comprising a rotary helix of increasing pitch, the pitch of the helix being so designed, with reference to the speed of the conveyor, that an article which is engaged by the helix only attains the speed of the conveyor as the article approaches the delivery end of the helix, further characterized in having a delivery helix of constant pitch, equal to that of the final spire of the spacing helix, arranged to engage the article as the latter is discharged by the spacing helix, and having a helical brush arranged at the opposite side of the article path from said delivery helix and which is of such pitch as to keep the article in contact with the rear wall of the groove of the delivery helix.

7. In combination in apparatus for arranging like articles in uniformly spaced relation, article-spacing means, means for moving articles, one after another through the field of action of the spacing means, supply means for moving the articles, one after another, toward the spacing means in a row (in which each article normally contacts the next following article), means whereby the leading article in the row is so oriented, as it enters the field of action of the spacing means, as to enable an element of the spacing means to enter between said leading article and the next following article, the means for moving the articles through the field of action of the spacing means being a constantly moving conveyor on which the articles rest, and the spacing means comprising a rotary helix of increasing pitch, the pitch of the helix being so designed, with reference to the speed of the conveyor, that an article which is engaged by the helix only attains the speed of the conveyor as the article approaches the delivery end of the helix, further characterized in having means operative to re-orient the article, thereby to restore it to the position which it occupied before being acted upon by the first orienting means, as the article is leaving the field of action of the spacing means.

8. The combination in apparatus for arranging like articles, each of substantially rectangular transverse section, in uniformly spaced relation, article-spacing means comprising a rotary screw of increasing pitch, conveyor means for moving articles one after another through the field of action of the spacing means, supply means for advancing the articles toward the spacing means in a column wherein the flat rear face of one article is in intimate contact with the flat forward face of the next following article in the column, so that the column presents substantially unbroken lateral surfaces devoid of recesses of sufficient size to receive the thread of the spacing screw, and means whereby the leading article in the column is so rotated about a vertical axis, as it enters the field of action of the rotary screw, as to provide a recess between the leading article and the next following article into which the thread of the spacing screw may enter.

9. The combination, according to claim 8, wherein the supply means comprises a constantly moving conveyor having guardrails at its opposite sides so spaced apart as to prevent orientation of the articles as they are moved along, one of said rails having an offset adjacent to the delivery end of said conveyor, thereby to permit the leading article of the row to be oriented by the action of the orienting means.

10. The combination, according to claim 9, wherein the orienting means comprises a ratchet type helix having the sloping wall of its groove arranged at an angle of the order of 10° with the axis of the helix.

11. The combination, in apparatus for arranging like articles in uniformly spaced relation, spacing means comprising a rotating spacing screw of increasing pitch, means for advancing articles one after another in a rectilinear path parallel to the axis of said screw into the field of action of the spacing means, a delivery helix of constant pitch arranged to engage the articles as they are delivered by the spacing screw, and means operative to keep the articles in contact with the rear wall of the groove of the delivery helix, the means for advancing the articles into the field of action of the spacing means comprising a constantly moving conveyor on which the articles rest with capability of relative motion of the conveyor and article, and means for moving the conveyor at substantially the same speed as that which is imparted to the article by the delivery helix.

12. The combination, according to claim 11, wherein the means for keeping the articles against the rear wall of the groove of the delivery helix is an helical brush of such pitch as to oppose movement of the article by the delivery helix.

13. The combination, according to claim 11, wherein the means for moving the article through the field of action of the spacing means comprises a constantly moving conveyor on which the articles rest with capability of relative motion of the conveyor and article, and means for moving the conveyor at substantially the same speed as that imparted to the article by the delivery helix.

14. The combination, according to claim 11, including an elongate rotary element, at the opposite side of the article path from the spacing screw, and which is operative to prevent orientation of the article about its vertical axis while within the field of action of the spacing means, until the article nears the delivery end of the spacing screw, and means tending to orient the article as it passes from the spacing screw to the delivery helix.

15. The combination in apparatus for arranging like articles in uniformly spaced relation while they are moving along a rectilinear path from a source of supply to a labeling machine, constantly moving conveyor means on which the articles rest while they are being spaced, spacing means comprising a constantly rotating helix of increasing pitch having its axis parallel to and at one side of the article path, and an elongate, rotary retaining element at the opposite side of the article path and having its axis parallel to that of the helix, said elongate element being so arranged as to restrain the article from turning about its vertical axis at least until it approaches the delivery end of the spacing helix, and means for turning the helix and the elongate rotary element in opposite directions, means providing bearings for the helix and said rotary element, and supports for the bearings so constructed and arranged as to permit the helix and said rotary element to be moved bodily toward or from each other to accommodate articles of different sizes.

16. The combination, according to claim 15, including hold-down means engageable with the top of the article after the latter leaves the spacing means and which is operative to prevent orientation of the article as the latter moves toward the labeling machine, and means operative to orient the article to a predetermined position relative to the conveyor path, just before it is engaged by the hold-down means, the means for orienting the article as it approaches the hold-down means comprising an helical brush located at the opposite side of the article path from the spacing helix and which contacts that peripheral face of the article which is opposite to that face which is engaged by the helix, the pitch of the brush being such that it tends to retard forward motion of that face of the article with which it frictionally engages.

17. In combination in article-feeding apparatus for arranging like articles in uniformly spaced relation, means for moving the articles along a predetermined, rectilinear path, article-spacing means including a rotating helix of increasing pitch disposed with its axis parallel to and at one side of the article path, and an elongate, rotating element arranged with its axis parallel to and at the opposite side of the conveyor path from the helix and which maintains the article in contact with the helix as the article moves along said path, means operative to turn the helix and said elongate, rotating element in opposite directions, supply means for advancing articles in a row, in which each article normally contacts the next following article, and means operative automatically to prevent approach of articles to the field of action of the spacing means except when a row, comprising a plurality of articles, is ready to be advanced by the conveyor means into the field of action of the spacing means.

18. The combination, according to claim 17, wherein the article-feeding apparatus is arranged to deliver the spaced articles to a labeling machine having a motor-driven, rotary drive shaft, and the means for transmitting motion from said drive shaft to the helix includes slip connections comprising an element which moves axially of the drive shaft in response to abnormal resistance to rotation of the helix, and a normally closed switch in the drive circuit of the labeling machine which is opened by such axial movement of said element, thereby to stop the labeling machine and the feeding apparatus.

19. The combination, according to claim 17, wherein the article-feeding apparatus is arranged to deliver the spaced articles to a labeling machine and having means for applying labels simultaneously to a plurality of articles during each machine cycle, having a motor-driven drive shaft which turns once for each cycle of operation of the labeling machine, means for transmitting motion from the drive shaft to the helix, said motion transmitting means comprising a rotary element, coaxial with the drive shaft and which is free to turn and slide on said shaft, a collar fixed to the drive shaft adjacent to said rotary element, the collar having symmetrically spaced recesses in its face corresponding in number to the number of articles which are labeled during each successive cycle, and the rotary element having detent members, in number and spacing like the recesses, spring means urging the rotary element toward the collar, thereby normally to engage the detent members with the recesses and thus turn said rotary element with the shaft, and means for transmitting motion from said rotary element to the helix.

20. The combination according to claim 15 wherein hold-down means engages the top of each article while it is on its way from the feeding apparatus to the labeling machine thereby preventing orientation of the article about its vertical axis, and wherein the groove between the turns of the helix is of a width at least as great as the longer transverse dimension of the articles to be handled, and means cooperable with the helix operative to turn the article about a vertical axis while in contact with the helix thereby to dispose the longest transverse dimension of the article in accurate alignment with the longitudinal center line of the article path, said article-turning means being so located as to contact the article just prior to its engagement by said hold-down means.

21. In combination in article-feeding apparatus for delivery of articles in uniformly spaced relation to a labeling machine, and wherein the articles are advanced one by one in succession along a rectilinear path by a constantly moving conveyor, and wherein hold-down means engages the top of each article while it is on its way from the feeding apparatus to the labeling machine thereby preventing orientation of the article about its vertical axis, spacing means comprising a constantly rotating screw whose axis is parallel to and at one side of the article path, and wherein the groove between successive turns of the screw thread is of a width at least as great as the longest transverse dimension of the article to be handled, orienting means cooperable with the screw so as to orient the article while in contact with the screw so that the longest transverse dimension of the article will be accurately aligned with the longitudinal center line of the article path, said orienting means being so located as to contact the article just prior to the engagement by the hold-down means, further characterized in that the orienting means is a helical brush arranged at the opposite side of the conveyor path from the screw.

22. The combination, according to claim 21, wherein the groove of the screw is so shaped as to provide a three-point contact for the article, and the brush is so designed as to cause the article simultaneously to engage all three of said contact points.

23. In combination in apparatus for delivering like articles in uniformly spaced relation to a processing apparatus, and wherein the articles are advanced, one by one, along a rectilinear path by a constantly moving conveyor, a rotary shaft whose axis is parallel to and at one side of the conveyor path and three coaxial helices fixed to said shaft, the first of said helices having its groove so shaped as to turn the article through a predetermined angle, the second helix, in succession, being of increasing pitch with its last turn of a pitch such that an article engaging it is moved at the same speed as the conveyor, and the third helix being of a constant pitch equal to that of the last turn of the second helix.

24. The combination, according to claim 23, wherein there is a rotary shaft at each side of the article path, and means for turning the shafts in opposite directions, and wherein similar helices are mounted on both shafts.

25. The combination, according to claim 24, wherein the helices are so relatively located axially of the respective two shafts that when the forward face of an article is in engagement with the rear wall of the groove of one helix, the rear face of the same article is in contact with the forward face of the groove of the opposite helix.

26. The combination, according to claim 24, wherein the speed of the conveyor is such that the article is restrained by the helices until it reaches the final turn of the second helix so that, until it reaches said final turn of the second helix, it contacts the leading wall of the groove of each helix.

27. The combination according to claim 11, wherein the means which is operative to keep the articles in contact with the rear wall of the grooves of the delivery helix is also operative to apply downward frictional force to the peripheral surfaces of the articles thereby to press them firmly onto the conveyor so as to resist tendency of the articles to tip, the means for so applying downward frictional force comprising a constantly rotating helical brush arranged to engage the peripheral surface of an article as the latter advances.

28. The combination, according to claim 17, wherein the means for preventing approach of articles into the field of operation of the spacing means comprises a gate which is normally so disposed as to prevent articles from advancing into the field of action of the spacing means, said gate being spaced from the receiving end of the spacer means a distance approximating the combined transverse thickness of a predetermined plurality of contacting articles, a solenoid operative, when energized, to withdraw the gate thereby to allow articles to advance, a motor driven shaft which turns once for each cycle of operation of the apparatus, a cam on said shaft, said cam having a dwell portion and an active portion, a normally open electric switch in the circuit of the solenoid, and means actuable by the cam for closing the switch thereby to energize the solenoid, said cam being so constructed and arranged as to cause the gate to open in properly timed relation to the operation of the spacer means to insure that the first article of the series which passes through the gate arrives at the spacer means in properly timed relation to the latter.

29. Article spacing apparatus according to claim 15, wherein the elongate rotary retaining element is a second helix, the opposed helices having threads of such shape as to define a series of article-receiving pockets directly above the conveyor path, certain of the article-contacting surfaces of said pockets being substantially perpendicular to the article path, while other article-contacting surfaces of the pockets are inclined relatively to the article path.

30. Apparatus for use in arranging like articles, which, in transverse section, are symmetrical and longer in one direction than in a direction at right angles thereto, in uniformly spaced relation comprising article-spacing means; means for moving such articles, one after another, along a rectilinear path, with the major axis of each article aligned with the longitudinal center line of said path, through the field of action of the spacing means, the spacing means comprising two rotary shafts arranged parallel to and at opposite sides respectively of the article path; an elongate article-engaging member mounted on each of said shafts and between which the articles move, one of said article-engaging members being a screw whose turns are spaced apart a distance at least equal to the length of the major axis of the article, and the other of said article-engaging members comprising a cylindrical roll; said apparatus being employed in association with a labeling machine and with hold-down means operative to prevent orientation of an article while being moved from the spacing means to the labeling machine; in combination, means operative, by contact with the peripheral surface of such an article, just prior to its engagement by the hold-down means, to insure that its major axis shall be in accurate alignment with the longitudinal center line of the article path as it approaches the hold-down means.

31. In combination in article-feeding apparatus for arranging like articles in uniformly spaced relation, means for moving the articles along a predetermined, rectilinear path, article spacing means including two oppositely turning shafts arranged parallel to and at opposite sides, respectively, of said path, a rotating helix of increasing pitch mounted on one of said shafts and with its axis parallel to and at one side of the article path, and an elongate rotating element mounted on the other of said shafts and arranged with its axis parallel to and at the opposite side of the conveyor path from said helix, and which maintains the articles in contact with said helix as the articles move along said path, means operative to turn the helix and said elongate rotating element in opposite directions, said elongate rotating element being a second helix, and the turns of each of said helices being spaced to admit a single article between them, supply means for advancing articles in a row, in which each article normally contacts the next following article, toward the field of action of the article spacing means, means operative automatically to prevent approach of articles to the field of action of the spacing means, except when a row, comprising a plurality of articles, is ready to be advanced by the conveyor means into the field of action of the spacing means, and means operative to release the foremost article in said row in such timed relation to the helices that it will accurately enter the spaces between adjacent turns of the opposed helices.

References Cited in the file of this patent

UNITED STATES PATENTS

| | | |
|---|---|---|
| 1,756,561 | Larsen | Apr. 29, 1930 |
| 1,799,106 | Laxo | Mar. 31, 1931 |
| 1,941,043 | Meyer | Dec. 26, 1933 |
| 2,025,108 | Hogg | Dec. 24, 1935 |
| 2,103,158 | Kantor | Dec. 21, 1937 |
| 2,258,185 | Lyon | Oct. 7, 1941 |
| 2,571,036 | Heyne | Oct. 9, 1951 |
| 2,630,904 | Bozek | Mar. 10, 1953 |